Jan. 22, 1946.   H. D. STEVENS   2,393,504
TIRE BUILDING APPARATUS (BEAD SETTING)
Original Filed July 17, 1940
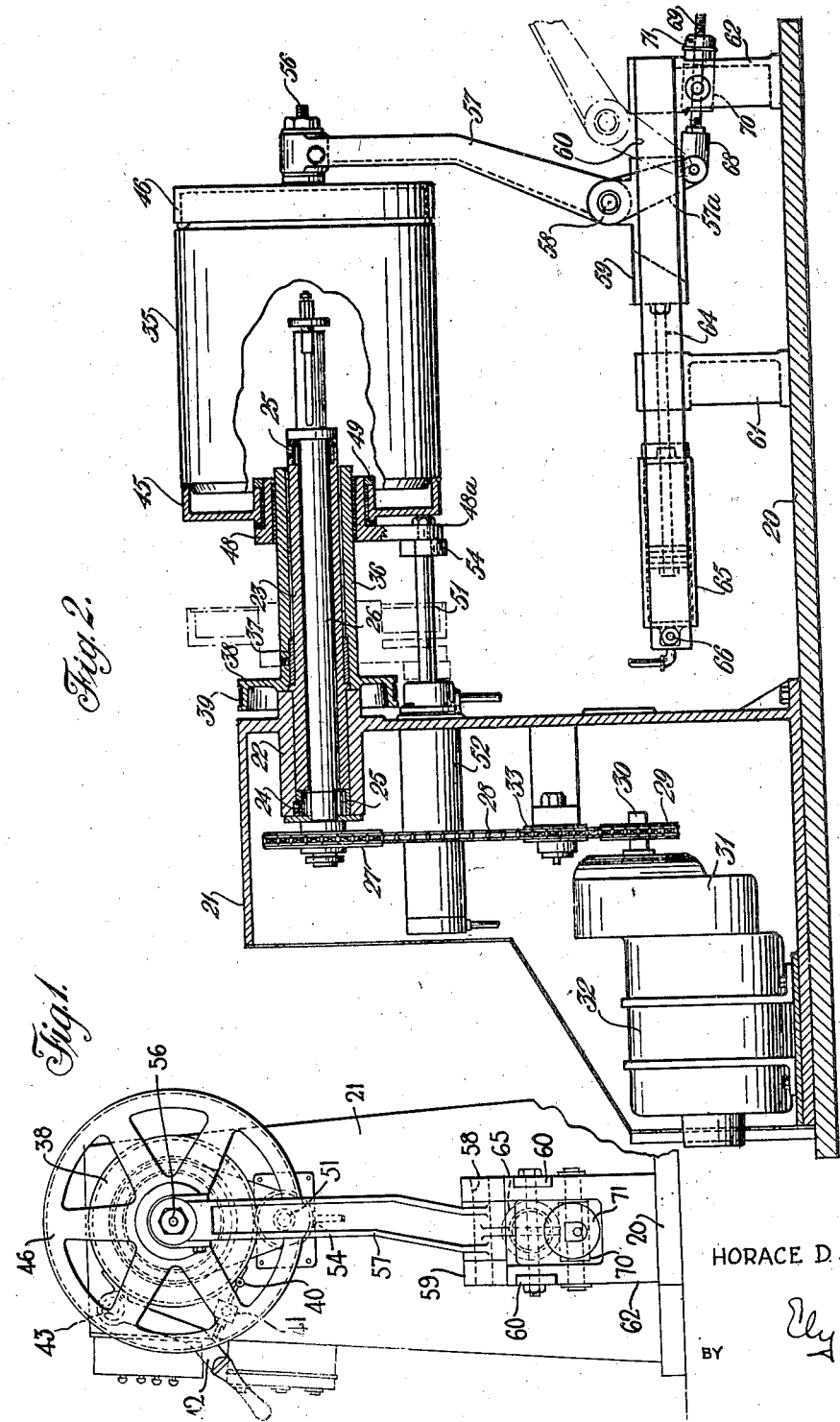
INVENTOR
HORACE D. STEVENS
BY
ATTORNEYS Patented Jan. 22, 1946

2,393,504

UNITED STATES PATENT OFFICE 2,393,504

TIRE BUILDING APPARATUS (BEAD SETTING)

Horace D. Stevens, Akron, Ohio, assignor to The Firestone Tire & Rubber Company, Akron, Ohio, a corporation of Ohio Original application July 17, 1940, Serial No. 345,974. Divided and this application August 4, 1944, Serial No. 548,060

2 Claims. (Cl. 154—9)

This invention relates generally to tire building apparatus, and more especially it relates to apparatus for the placing or setting of the bead structures in the manufacture of pneumatic tire casings.

The invention is a division of the subject matter of my co-pending application for Letters Patent, Serial No. 345,974, filed July 17, 1940, now Patent No. 2,381,379, dated August 7, 1945.

The chief object of the invention is to conserve time and manual labor in the manufacture of tire casings. More specifically the invention aims to provide novel mechanism for applying one of the tire beads to a tire carcass during fabrication of the latter; and to provide in an improved manner for moving said mechanism into and out of operative association with the drum or form on which a tire is being fabricated. Other objects will be manifest as the description proceeds.

In the manufacture of pneumatic tire casings, bead elements are mounted on the opposite sides thereof. The usual procedure is to mount the bead elements upon bead setting rings prior to the starting of the tire building operation, and to move said rings toward the tire to apply the bead elements thereto at the proper time during the construction of the tire. Tires usually are built upon drums or forms that are carried upon the ends of rotatable spindles that extend axially to one side thereof, and it is common practice to mount one of the bead setting rings upon said spindle for movement toward and away from the tire building form. The other bead setting ring, which sets the outer bead element, requires different treatment since this ring must be moved to a position sufficiently removed from the form to enable the operator conveniently to remove a finished tire from the form after he has collapsed the same. It is to improvement of bead setting devices of the last mentioned type that this invention is directed.

Of the accompanying drawing:

Fig. 1 is an end elevation of tire building apparatus embodying the invention; and Fig. 2 is a side elevation thereof, part of the apparatus being broken away and in section.

Referring to the drawing, there is shown a bed plate 20 at one side of which is mounted an upright housing 21. Formed in the upper part of the latter is a horizontally disposed tubular bracket 22, and mounted in the latter is a sleeve or quill 23 that projects laterally from the housing 21, over said base plate 20, said quill being secured against rotation by a set screw 24.

Journaled in bearings 25, 25 at the respective ends of quill 23 is a driving spindle 26 that projects beyond the opposite ends of the quill, the projecting end thereof within housing 21 being provided with a sprocket 27. Trained about the latter is a sprocket chain 28 that also is trained about a driving sprocket 29 on the shaft 30 of a speed reducing device 31 that is coupled to a reversible motor 32, the motor being located in the bottom of housing 21. An adjustable idler gear 33 is provided for keeping the sprocket chain 28 taut.

Mounted upon the other end of the spindle 26, exteriorly of the housing 21, is an annular collapsible tire building form or drum 35 having the usual shoulders at its opposite ends. Said form or drum 35 is of standard construction well known to the trade, so that it is not believed necessary to show and describe herein the details of the mechanism that effects collapse thereof other than to say that collapsing of the drum, and subsequent restoration thereof to annular shape, is effected by means of relative angular movement between the spindle 26 and a tubular sleeve 36 that is journaled upon the quill 23, exteriorly thereof, a bearing bushing 37 being interposed between said quill and said sleeve. The outer end of the sleeve 36 extends into the drum 35 and is connected to the collapsing mechanism thereof by suitable means (not shown). The opposite end of the sleeve 36 abuts the outer end of bracket 22, and is formed thereat with an integral brake drum 38 that is embraced by a brake band 39. One end of the latter is connected to an eye-bolt 40 that is adjustably mounted in an anchoring structure 41 fixed upon the housing 21. At its other end the brake band 39 is secured to one arm of an angular brake lever 42 that is pivotally mounted at its elbow at 43 upon the housing 21, the other arm of the lever constituting a hand-grip portion. The arrangement is such that when the hand-grip portion of the lever 42 is pulled forwardly, the brake band 39 is tightened about the brake drum, with the result that if the brake drum is being rotated in the direction that it normally rotates during the building of a tire, relative rotative movement of the spindle 26 and brake-sleeve 36 will effect collapse of the drum. When it is desired to expand the collapsed drum, the latter is rotated in the opposite direction and the brake thereafter again applied, as is well understood in this art.

The mounting of tire beads upon the drum 35, during the building of a tire thereon, is effected by means of respective bead-placing rings 45, 46 that are positioned at opposite ends of the drum, normally in spaced relation thereto, and movable into engagement therewith. Each bead ring is formed with a peripheral groove on the margin thereof nearest the drum, which groove receives a tire bead that is placed therein at the beginning of a tire building operation, the bead adhering to the tire fabric on the drum, when applied thereto, by reason of its inherent tackiness.

Bead-placing ring 45, which is designated the "inner" bead ring because it is disposed nearest the housing 21, is rotatably journaled upon the axial hub of a ring holder 48, and retained thereon by means of a collar 49 on said hub. Said holder 48 is mounted upon the sleeve 36 and is capable of sliding movement longitudinally thereof, said sleeve being rotatable relatively of said holder. For effecting axial movement of the holder 48, said holder is formed with a downwardly extending arm 48a to which is connected the piston rod 51 of a double-acting fluid pressure operated cylinder 52, the latter being mounted upon a wall of the housing 21 and being located interiorly thereof. A rubber bumper 54 is mounted upon the piston rod 51 for cushioning the impact of the arm 48a against the adjacent cylinder head.

The "outer" bead ring 46 is journaled upon a stud 56 carried at the free end of a ring holder 57 that consists of a slightly angular lever arm that is pivotally mounted at 58 upon a slide 59, the latter being carried by and between a pair of spaced-apart horizontal slide-bars or rails 60, 60 that are supported by a pair of brackets 61, 62 mounted upon the bed plate 20. The slide 59 is positioned between the brackets 61, 62, and its movement in one direction is limited by bracket 62. For moving the slide longitudinally of the rails 60, said slide is connected at one of its ends to the piston rod 64 of a double-acting fluid pressure operated cylinder 65, the latter being supported at its rear end by a rod 66 carried by and between the rails 60, at the ends thereof nearest the housing 21. The ringholder arm 57 has a portion 57a that extends downwardly through a slot in slide 59, below the pivotal connection 58, the free end of said portion 57a being connected to a clevis 68 having a stem 69 that extends through a swivel 70, the latter being pivotally carried by a bracket 62. The end portion of stem 69 has an adjusting sleeve 71 threaded thereon, thereby enabling adjustment of the clevis 68 relatively of the swivel 70.

The arrangement is such that the arm 57 constitutes a lever of the third class, the fulcrum of the lever being at the clevis 68 and power being applied to the lever at the pivotal connection 58. Thus it will be seen that by charging opposite ends of the cylinder 65 the slide 59 may be reciprocated, thereby moving the lever arm 57 between the operative position shown in full lines in Fig. 2 and the inoperative position shown in broken lines in the same figure. Means (not shown) is provided for effecting concurrent operation of cylinder 65 and cylinder 52 so that both bead rings are applied to the drum at the same time.

The feature of constituting the arm 57 a lever of the third class enables the bead ring 46 to be moved through a relatively wide arc by relatively short movement of the piston of cylinder 65. Thus the bead ring readily is moved to an inoperative position that is clear of the drum 35, where it does not hamper the operator while he is collapsing the drum and removing a finished tire therefrom. The invention conserves time and labor and achieves the other advantages set out in the foregoing statement of objects.

Modification may be resorted to without departing from the spirit of the invention or the scope thereof as defined by the appended claims.

What is claimed is:

1. In a tire building apparatus, a drum, a bead setting device comprising a lever of the third class, a bead setting ring journaled on the free end of said lever and movable in a curvilinear course into and out of operative engagement with an end of the drum, an adjustable swiveled device constituting a fulcrum and connecting the other end of the lever to a fixed point, a slide on which said lever is pivotally mounted intermediate the ends of said lever, and power means connected to said slide for effecting rectilinear movement thereof.

2. In a tire building apparatus, a rotatable drum, a bead setting device comprising a lever of the third class, a bead setting ring journalled on the free end of said lever and movable with the lever in a curvilinear path into and out of operative engagement with an end of the drum, a swiveled pivotal connection for the other end of the lever and constituting the fulcrum thereof, reciprocable supporting means mounted for rectilinear movement, means pivotally connecting said lever to said reciprocable supporting means and means for effecting movement of said reciprocable supporting means.

HORACE D. STEVENS.